Sept. 4, 1934.  C. BOUILLON  1,972,373
CLUTCH MECHANISM FOR LATHE APRONS
Filed March 21, 1932  3 Sheets-Sheet 1
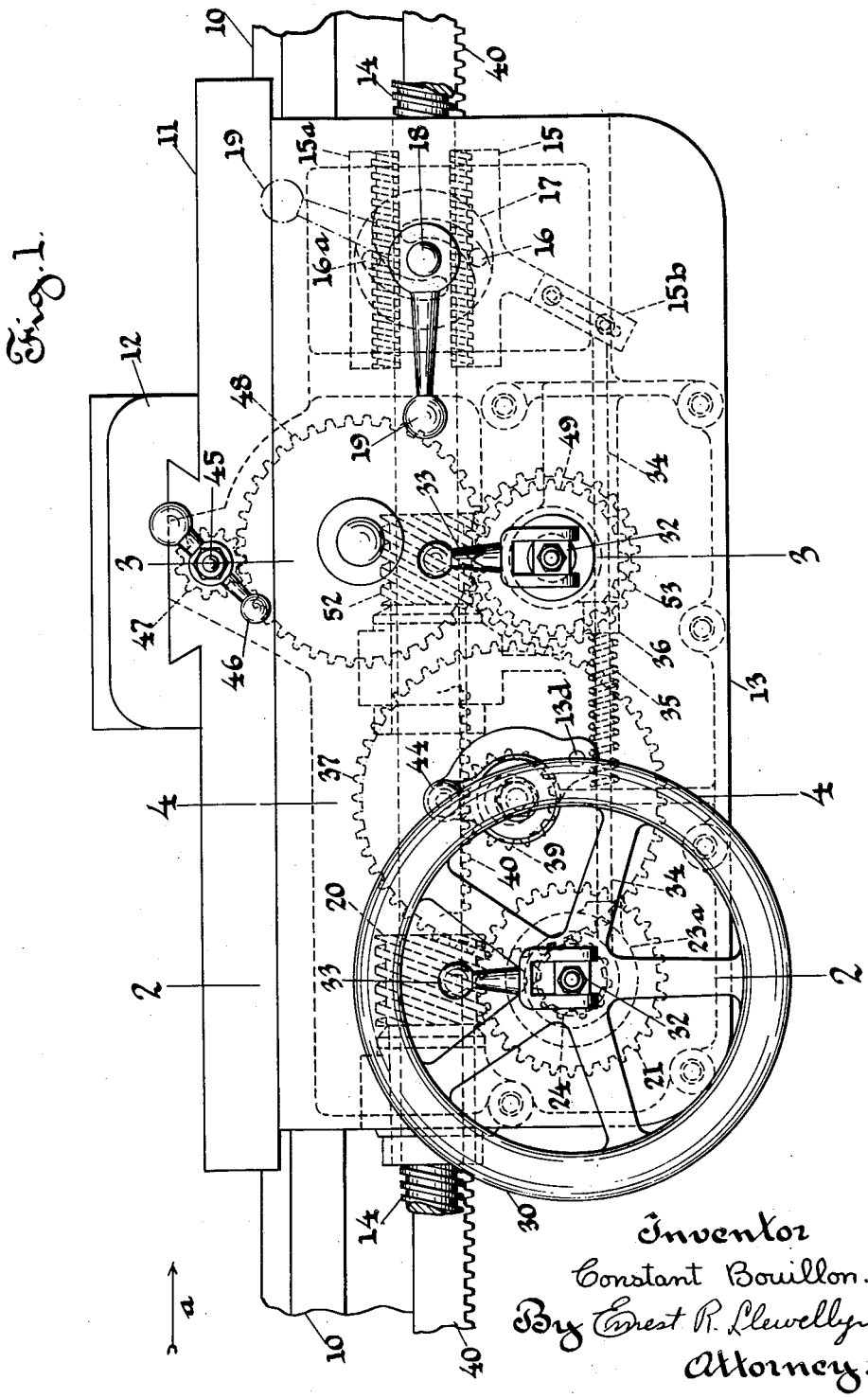
Inventor
Constant Bouillon.
By Ernest R. Llewellyn.
Attorney.

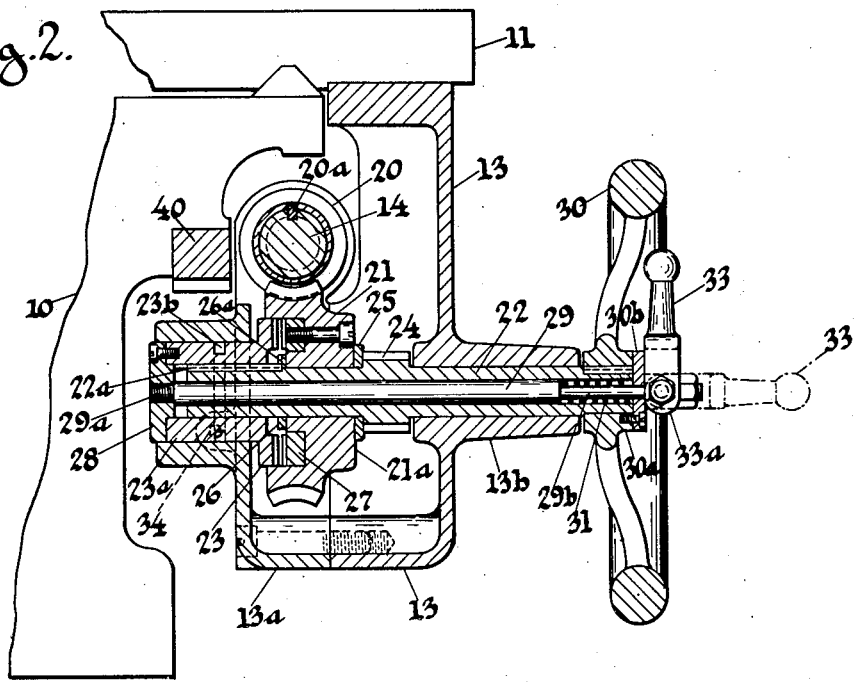

Sept. 4, 1934.   C. BOUILLON   1,972,373
CLUTCH MECHANISM FOR LATHE APRONS
Filed March 21, 1932   3 Sheets-Sheet 3
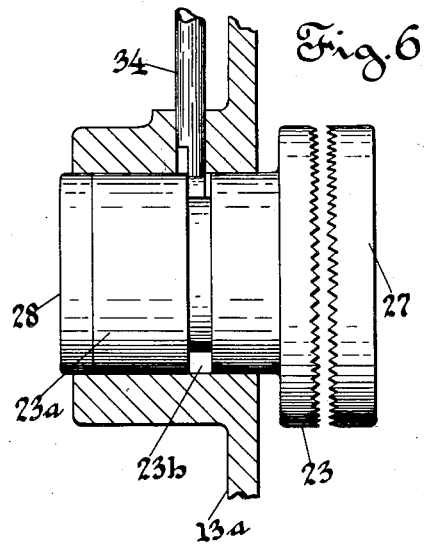
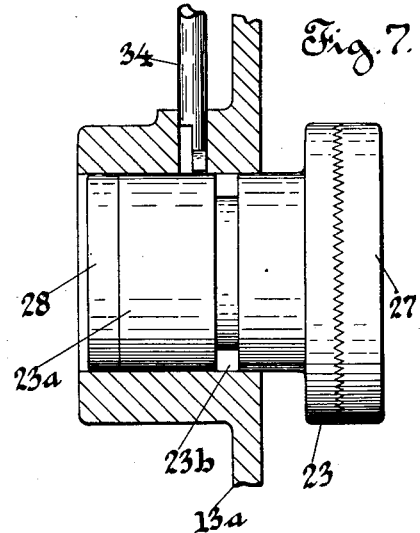
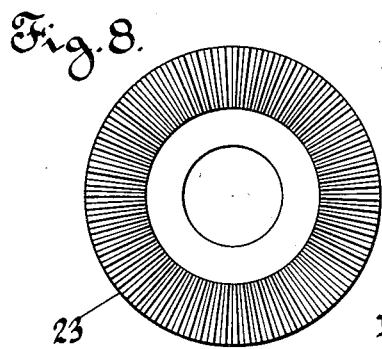
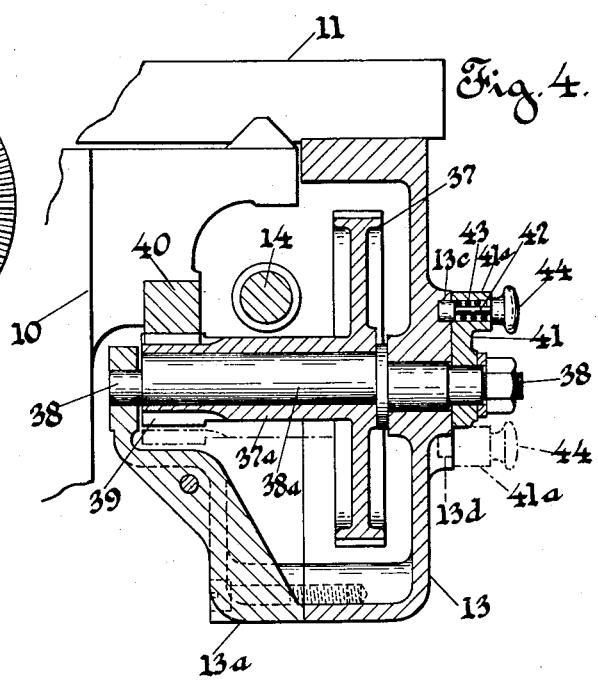
Inventor.
Constant Bouillon.
By Ernest R. Llewellyn.
Attorney.

Patented Sept. 4, 1934

1,972,373

UNITED STATES PATENT OFFICE 1,972,373

CLUTCH MECHANISM FOR LATHE APRONS

Constant Bouillon, Torrington, Conn., assignor to The Hendey Machine Company, Torrington, Conn., a corporation of Connecticut Application March 21, 1932, Serial No. 600,101

4 Claims. (Cl. 82—22)

This invention relates to machine tools and more particularly to a lathe apron actuating mechanism for traversing the apron and tool carriage.

In the various types of lathes the bed has slidably mounted thereon a carriage upon which the tool support or slide is mounted. Depending from the carriage is the apron in which is mounted the gear train which may be optionally engaged with a rotating lead screw for automatically traversing the apron and carriage through the gear train and which is commonly referred to as the power feed. The gear train may be also engaged with a stationary rack and manually actuated through a hand wheel. The transverse feed of the tool support or slide is also effected through the apron gear train. This transverse feed may be optionally engaged with the rotating lead screw to effect a power feed or, disengaged from the power feed and be manually operated.

Heretofore various devices have been utilized in the selective engaging and operating of these feeds which include various and well-known types of clutches of the friction or positive toothed character as shown and completely described in Patents Nos. 1,832,011, 1,692,705, or 1,218,784. In these various devices it is necessary to employ a multiplicity of parts which due to their arrangement and operation require the interpositioning of thrust bearings in addition to the bearings required by the rotating members. It is also essential, particularly in the power traversing feeds of the carriage, that one of the feeds remain positively disengaged when an opposed power or hand feed is being used.

Therefore, the object of my present invention is to provide a lathe apron with a gear train in which the traversing feeds of the apron may be optionally and positively engaged and which, when one feed is engaged, the other means of engagement are positively inoperative. Another object in my invention is to provide a clutch operating mechanism that may be assembled and rotated as a unit when engaged or disengaged and whereby I am permitted to eliminate the necessity of interposing anti-friction thrust bearings. A further object of my invention is to provide a combination apron mechanism whereby, when one means of feed is being utilized, connections to the other feeds are disengaged in a manner that permits connecting gears of the train to remain stationary thus producing less friction drag which results in greater freedom of movement of the carriage and apron.

To accomplish the above objects my invention comprises a novel combination and arrangement of parts hereinafter described and more specifically pointed out in the appended claims.

In the accompanying drawings I have shown my invention embodied with a lathe apron sufficient to enable those skilled in the art to understand the construction and operation thereof.

Referring to the drawings:—

Fig. 1 is a front elevation of a lathe apron depending from a lathe carriage which is slidably mounted on a lathe bed;

Fig. 2 is a sectional elevation taken along line 2—2, Fig. 1, viewing in the direction of arrow $a$, same figure;

Fig. 3 is a sectional elevation taken substantially along line 3—3, Fig. 1, viewing in direction of arrow $a$, same figure;

Fig. 4 is a sectional elevation taken along line 4—4, Fig. 1, viewing in direction of arrow $a$, same figure;

Fig. 5 is a detail plan view of one of the operating handles;

Fig. 6 is a detail of the clutch members in their disengaged position, a lock rod being shown engaged with one of the clutch members;

Fig. 7 is a view corresponding to Fig. 6 but shows the parts in a different position; and Fig. 8 is a detail of the faces of the clutch members.

As illustrated in the drawings the lathe bed 10 has slidably mounted thereon the carriage 11. The carriage 11 has slidably mounted thereon the cross-slide and tool support 12. Secured to the carriage 11 and depending therefrom is the front plate of the apron 13. The apron is provided with a back plate 13$a$ which, when assembled with the front plate, forms substantially a U-shaped chamber.

The lead screw 14, which is rotated in the usual manner from the lathe headstock (not shown), extends through suitable bearings in the apron.

The usual internally threaded half nuts 15, 15$a$ are slidably mounted in suitable bearings in the apron. Said half nuts are provided with suitable projections 16, 16$a$ which are engaged by the cam 17 secured to the inner end of a stud 18 rotatably mounted in a suitable bearing in the apron. Secured to the outer end of the stud 18 is the operating lever 19. As illustrated, the half nuts 15, 15$a$ and operating lever 19 are in their open and disengaged position. When the lever 19 is rotated to its opposed position, as shown by broken lines, Fig. 1, the internal threads of the nuts 15, 15$a$ engage with the rotating lead screw 14, thus traversing the carriage and apron in direct relation to the lead screw as is well known.

A worm 20 is mounted on the lead screw, said worm being provided with a key 20a which engages with a continuous key-way extending lengthwise of the lead screw. This causes the worm 20 to be rotated with the lead screw 14, the worm being restrained, in a suitable manner, against longitudinal movement.

The worm 20 meshes with a suitable gear 21 rotatably mounted on a sleeve 22. The front portion of said sleeve is rotatably supported in the bearing 13b of the apron, the opposed end of said sleeve extending into the bore of the hub portion 23a of a clutch member 23. Said sleeve 22 has, in this instance, a pinion 24 formed integral therewith, said pinion 24 forming a stop shoulder for a washer 25, rotatably mounted on said sleeve 22, which provides a bearing surface for one end of the gear hub 21a. The opposed end of said gear hub 21a has its bearing against a washer 26 mounted on the sleeve 22. This washer 26 is provided with a notch 26a adapted to receive the end of a key 22a which is secured in the sleeve 22. A hand wheel 30 is secured to the outer end of the sleeve 22.

The gear 21 is provided with a recessed portion adapted to receive and have secured therein, the clutch member 27 which is adapted to be engaged by the clutch member 23.

The hub 23a of the clutch member 23 is rotatably mounted in a suitable bearing of the apron back plate 13a. Said hub 23a is slidably keyed, by means of the key 22a, to the sleeve 22. Secured to the outer end of said hub 23a is a cap 28 which is adapted to retain the threaded end 29a of an operating rod 29 which extends through the bore of the sleeve 22. Said operating rod 29 is provided with a reduced portion 29b. A compression spring 31 encircles said reduced portion 29b and bears at one end against a shoulder of the rod 29, the opposed end of said spring having its bearing against a cap 30b secured to the hand wheel hub 30a. The outer end of the reduced portion 29b, of the rod 29, has adjustably secured thereto a rectangular block 32 which has pivotally attached thereto a bifurcated operating lever 33.

The hub 23a of the clutch member 23 is provided with an annular recess 23b which is adapted to receive the end of a stop rod 34 when the clutch member is in its disengaged position, see Figs. 2 and 6. Said rod 34 is slidably mounted in suitable bearings in the apron. The opposed end of said rod 34 engages with a depending angular cam arm 15b of the nut 15. A compression spring 35 encircles the rod 34, said spring having its bearing, at one end, against a cross member of the apron, the opposed end of said spring bearing against an adjustable collar 36 secured on the rod 34. This spring 35 normally forces the rod 34 to the right and retains it in engagement with the depending arm 15b. When the half nuts 15, 15a are in their open position, see Fig. 1, the rod 34 is in its extreme position to the right and retracted from engagement with the annular recess 23b of the clutch hub 23a, see Fig. 7. When the stop rod 34 is in its retracted position, as shown at Fig. 7, the lever 33 can be moved to its operative position, as shown by broken lines, Fig. 2, the cam ends 33a of the lever engaging the cap 30b and through the rod 29 moves the clutch member 23 to the right and into engagement with the clutch member 27 secured to the gear 21 which is in mesh with the rotating lead screw 14. This means of traversing the apron and carriage can be utilized only when the half nuts 15, 15a are in their open and inoperative position. When the half nuts are closed the rod 34 is forced, by the depending cam arm 15b, to the left and into engagement with the annular recess 23b of the clutch member 23 and thereby retaining this means inoperative.

When it is desired to use the hand wheel 30 for traversing the apron and carriage, I have provided a gear 37, see Figs. 1 and 4, which meshes with the pinion 24. The hub 37a of this gear 37 is rotatably mounted on the eccentric portion 38a of a stud 38 which is rotatably mounted in suitable bearings in the apron. The hub 37a has formed, in this instance, integral therewith, a pinion 39 adapted to be engaged with the rack 40 secured to the lathe bed 10.

Secured to the outer end of the stud 38 is a lever 41 having a hub portion 41a with a bore adapted to receive a lock pin 42. Said lock pin is retained in its projecting position, to engage the oppositely disposed registering holes 13c, 13d, by means of a compression spring 43. The outer end of said lock pin is provided with a pull knob 44 by means of which the lock pin may be disengaged and the lever 41 rotated to its opposed position. As the lever 41 is moved to its opposed position, as shown by broken lines, Fig. 4, the rotation of the eccentric portion 38a of the stud 38 will cause the pinion 39 to be moved out of engagement with the rack 40 thus disengaging the hand wheel means of traversing the carriage and apron.

The carriage 11 has mounted therein the usual cross slide operating screw 45, said screw having secured to the outer end thereof an operating handle 46 by which the screw 45 is rotated to move the cross slide 12. Secured to the screw 45 is a pinion 47 which meshes with an intermediate gear 48. Said gear 48 meshes with a gear 49 secured to the sleeve 50. The front portion of said sleeve is rotatably supported in the bearing 13e of the apron, the opposed end of said sleeve extending into the bore of the hub portion 51a of the clutch member 51.

The worm 52 is mounted on the lead screw 14, said worm being provided with a key 52a which engages with a continuous keyway extending lengthwise of the lead screw. This causes the worm 52 to be rotated with the lead screw 14, the worm being restrained, in a suitable manner, against longitudinal movement. The worm 52 meshes with a suitable gear 53 rotatably mounted on the sleeve 50. A friction washer 54 is interposed between the gear 49, secured to the sleeve 50, and the gear 53 rotatably mounted on said sleeve. The washer 55 retains the gear 53 positioned on the sleeve 50. This washer 55 is provided with a notch 55a adapted to receive one end of a key 50a which is secured in the sleeve 50.

The gear 53 is provided with a recessed portion adapted to receive and have secured therein, the clutch member 56 which is adapted to be engaged by the clutch member 51. The hub 51a of the clutch member 51 is rotatably mounted in a suitable bearing of the apron back plate 13a. Said hub 51a is slidably keyed, by means of the key 50a, to the sleeve 50. Secured to the outer end of said hub 51a is a cap 57 which is adapted to retain the threaded end 58a of the operating rod 58 which extends through the bore of the sleeve 50. Said operating rod 58 is provided with a reduced portion 58b. A compression spring 59 encircles said reduced portion 58b and bears at one end against a shoulder of the rod 58, the opposed end of said spring having its bearing against a cap 60 secured to the end of the sleeve 50. The outer end 58b of said rod 58 is provided with an operating lever 33 as previously described. The operation of the clutch mechanism in the apron and carriage traverse first described and the transverse slide feed are the same. The gear 21, 53 is rotated, by the lead screw 14, freely upon the sleeve 22, 50.

When the clutch members 23, 27, and 51, 53 are engaged, as shown at Fig. 3, the sleeve 22, 50, and gear 21, 53 are rotated together as a complete unit. It will be readily seen that with this novel construction I have eliminated the requirement of anti-thrust members being interposed between the members comprising the unit and thereby simplified assembling and adjusting the unit while maintaining the desirable features of a quick, positive clutch mechanism.

Having thus described my invention it will be evident that changes and modifications may be made therein by those skilled in the art without departing from the spirit and scope thereof, therefore, I do not wish to be limited to the specific details herein disclosed, but what I claim is:—

1. In a lathe having a tool carriage and apron; a prime mover feed shaft for said carriage and apron, means for engaging said feed shaft with said carriage and apron to impart longitudinal movement thereto, a second means for engaging said feed shaft to impart longitudinal movement when said first means is disengaged, said second means comprising a gear train having a rotatable sleeve with a gear normally free to rotate thereon, a clutch member secured to said gear, a co-operating clutch member slidable on said sleeve, a rod extending through said sleeve and connecting said slidable clutch member with means to actuate said rod to engage said clutch members to form a complete rotatable unit.

2. In a lathe having a tool carriage and apron; a prime mover feed shaft for said carriage and apron, gear trains, for engagement with said feed shaft, to impart longitudinal and cross feeds, a rotatable sleeve embodied in said gear trains, a gear normally free to rotate on said rotatable sleeve, a clutch member secured to said freely rotatable gears, a co-operating clutch member having its bearing in said apron and slidable on said sleeve, a rod extending through said sleeve and connecting said slidable clutch member with means, comprising a snap lever, to actuate said rod to engage said clutch members to form a complete rotatable unit.

3. In a lathe having a tool carriage and apron; the combination of a prime mover feed shaft and feed rack, gear trains, for engagement with said feed shaft and rack, to impart longitudinal and cross feeds, a rotatable sleeve for said feed shaft gear trains, a gear normally free to rotate on said rotatable sleeve, a pinion secured to said sleeve, said sleeve having one of its bearings in the apron housing and its opposed bearing in a clutch member which is slidably secured to said sleeve and movably supported by said apron housing, a clutch member secured to said freely rotatable gear, an operating element secured to the outer end of said sleeve, an operating rod extending through said sleeve and connecting said slidable clutch member with means, comprising a snap lever, to actuate said rod to engage said clutch members and form a complete rotatable unit; an eccentric shaft rotatably supported in said apron housing, a second sleeve rotatably supported on said shaft, a gear secured to said second sleeve and meshing with said first sleeve pinion, a second pinion integral with said second sleeve with means for rotating said eccentric shaft to engage and disengage said second pinion with said rack.

4. A lathe apron having gear trains for engagement with a rotary member to impart independent longitudinal and cross feeds; means independent of said gear trains and adapted to be engaged with said rotary member to impart a longitudinal feed; coacting means to prevent engagement of one of said longitudinal feeds while the opposed longitudinal feed is in engagement; rotatable sleeves embodied in said longitudinal and cross feed gear trains with gears normally free to rotate on said sleeves, clutch members secured to said freely rotatable gears with co-operating clutch members slidable on said sleeves, a rod extending through each sleeve and connecting said slidable clutch members with means to actuate said rods to independently engage said clutch members to form complete rotatable units.

CONSTANT BOUILLON.